(12) United States Patent
Rittman

(10) Patent No.: US 6,687,632 B1
(45) Date of Patent: Feb. 3, 2004

(54) TESTING OF CATV SYSTEMS

(75) Inventor: Daniel E. Rittman, Fishers, IN (US)

(73) Assignee: Trilithic, Inc., Indianapolis, IN (US)

( * ) Notice: Subject to any disclaimer, the term of this patent is extended or adjusted under 35 U.S.C. 154(b) by 0 days.

(21) Appl. No.: 09/582,561

(22) PCT Filed: Jan. 22, 1999

(86) PCT No.: PCT/US99/01432

§ 371 (c)(1),
(2), (4) Date: Jun. 27, 2000

(87) PCT Pub. No.: WO99/38023

PCT Pub. Date: Jul. 29, 1999

Related U.S. Application Data

(60) Provisional application No. 60/072,409, filed on Jan. 23, 1998.

(51) Int. Cl.[7] .............................................. G01R 29/02
(52) U.S. Cl. ...................................... 702/79; 250/336.1
(58) Field of Search ............................. 702/79, 57, 75, 702/182, 187, 189, 199; 250/336.1, 339.07, 348, 493.1

(56) References Cited

U.S. PATENT DOCUMENTS

| | | | |
|---|---|---|---|
| 4,041,381 A | 8/1977 | Hwa | |
| 4,136,326 A * | 1/1979 | Naudot et al. | 367/39 |
| 4,173,897 A * | 11/1979 | Forstermann et al. | 73/609 |
| 4,507,621 A * | 3/1985 | Meyer | 331/78 |
| 4,738,529 A * | 4/1988 | Hug | 356/73.1 |
| 4,816,669 A | 3/1989 | Anderson | |
| 4,838,690 A | 6/1989 | Buckland et al. | |
| 4,893,006 A | 1/1990 | Wakai et al. | |
| 4,904,864 A | 2/1990 | Dakin et al. | |
| 4,970,466 A * | 11/1990 | Bolles et al. | 324/533 |
| 5,008,545 A | 4/1991 | Anderson et al. | |
| 5,066,118 A | 11/1991 | Buerli | |
| 5,069,544 A | 12/1991 | Buerli | |
| 5,307,140 A | 4/1994 | Lewis | |
| 5,323,224 A | 6/1994 | Wada | |
| 5,343,286 A | 8/1994 | Keeble et al. | |
| 5,514,965 A * | 5/1996 | Westwood | 324/533 |
| 6,216,250 B1 * | 4/2001 | Williams | 714/799 |
| 6,294,942 B2 * | 9/2001 | Bertin et al. | 327/327 |
| 6,385,237 B1 * | 5/2002 | Tsui et al. | 375/228 |

FOREIGN PATENT DOCUMENTS

| | | |
|---|---|---|
| JP | 04225130 | 8/1992 |
| WO | WO92/11710 | 7/1992 |
| WO | WO93/07687 | 4/1993 |
| WO | WO96/05665 | 2/1996 |

OTHER PUBLICATIONS

"Proofing and Maintaing Upstream Cable Plant with Digital Signal Analysis Techniques", Thomas H. Williams, Pages 7–18.

* cited by examiner

*Primary Examiner*—Marc S. Hoff
*Assistant Examiner*—Edward Raymond
(74) *Attorney, Agent, or Firm*—Barnes & Thornburg

(57) ABSTRACT

A method and apparatus for determining the location of an impedance mismatch in a digital communication circuit (22) generate (20) at least quasi-random data, transmit the data along the circuit (22) from a transmitting end of the circuit (22), recover (24) reflections from impedance mismatches in the circuit (22) adjacent the transmitting end of the circuit (22), correlate the reflections with the data to generate a correlation result, identify a reflection peak in the result, and multiply the propagation velocity of the data through the circuit (22) by a time delay to the reflection peak.

22 Claims, 10 Drawing Sheets

TESTING OF CATV SYSTEMS

CROSS-REFERENCES TO RELATED APPLICATIONS

This application is a U.S. national counterpart application of international application serial No. PCT/US99/01432 filed Jan. 22, 1999, which claims priority to U.S. provisional application serial No. 60/072,409 filed Jan. 23, 1998.

FIELD OF THE INVENTION

This invention relates to the detection of impedance mismatches in circuits. It is disclosed in the context of a system for detecting impedance mismatches in forward and return CATV signal paths, but it is believed to be useful in other applications as well.

BACKGROUND OF THE INVENTION

Various techniques for detecting impedance mismatches and other phenomena in signal paths are known. There are, for example, the techniques illustrated and described in U.S. Pat. Nos. 5,343,286; 5,323,224; 5,307,140; 5,069,544; 5,066,118; 5,008,545; 4,904,864; 4,893,006; 4,838,690; and, 4,816,669. While most of these references disclose their techniques in the context of optical time domain reflectometry (OTDR), the concepts disclosed in them are applicable to other impedance mismatch detecting techniques as well. In some of these references, reflections from impedance mismatches are employed in one way or another to determine the existence, and in certain circumstances the locations, of those mismatches. These references all teach the application of test signals having configurations calculated to enhance detection of such reflections and extraction of the information sought from such reflections. Other techniques have been proposed for detecting imperfections in forward and return circuits in CATV systems. There are, for example, the systems proposed in Williams, Proofing and Maintaining Upstream Cable Plant With Digital Signal Analysis Techniques, May, 1997. However, this paper also proposes the application of a test signal having a configuration calculated to enhance detection of imperfections in the forward and return paths of CATV systems. Most of such systems also require a clear channel for the conduct of the test.

DISCLOSURE OF THE INVENTION

According to one aspect of the invention, a method for determining the transit time to a feature in a digital communication circuit comprises generating a quantity of data that is at least quasi-random, transmitting the quantity of at least quasi-random data along the circuit from a transmitting end of the circuit, recovering reflections from the circuit adjacent the transmitting end of the circuit, correlating the reflections with the quantity of data to generate a correlation result, identifying a reflection peak in the result, and correlating the reflections with the data to generate a correlation result, for identifying a reflection peak in the result, and for determining a time delay to the reflection peak.

Illustratively according to this aspect of the invention, the method comprises a method for determining the location of an impedance mismatch in the circuit, the step of recovering reflections from the circuit comprising the step of recovering reflections from impedance mismatches in the circuit. The method further comprises the step of multiplying the propagation velocity of the data through the circuit by the time delay to the reflection peak to determine the round trip distance to the impedance mismatch.

Illustratively according to this aspect of the invention, the steps are repeated, and average time delays over the number of repetitions are developed.

Illustratively according to this aspect of the invention, the step of developing average time delays over the number of repetitions comprises summing the time delays determined by the repetitions, and dividing the sum of the time delays by the number of repetitions.

Additionally illustratively according to this aspect of the invention, the method further comprises the step of passing the data through a digital root raised cosine filter.

Further illustratively according to this aspect of the invention, the step of passing the data through a digital root raised cosine filter comprises the step of passing the data through a digital root raised cosine filter with an excess bandwidth factor of 20%.

According to another aspect of the invention, an apparatus for determining the transit time to a feature in a digital communication circuit comprises a first device for generating data that is at least quasi-random, a second device for coupling the first device to the circuit to transmit the at least quasi-random data along the circuit from a transmitting end of the circuit, a third device for recovering reflections from the circuit, the third device coupled to the circuit adjacent the transmitting end of the circuit, and a fourth device for correlating the reflections with the data to generate a correlation result, for identifying a reflection peak in the result, and for determining a time delay to the reflection peak.

Illustratively according to this aspect of the invention, the apparatus comprises an apparatus for determining the location of an impedance mismatch in the circuit, the third device recovering reflections from impedance mismatches in the circuit, and the fourth device comprising a fourth device for multiplying the propagation velocity of the data through the circuit by the time delay to determine the round trip distance to the impedance mismatch.

Illustratively according to this aspect of the invention, the fourth device comprises a fourth device for correlating multiple reflections with multiple strings of data, and for developing average time delays over the number of repetitions.

Illustratively according to this aspect of the invention, the fourth device comprises a fourth device for correlating multiple reflections with multiple strings of data to generate multiple correlation results, for identifying multiple reflection peaks in the multiple correlation results, for multiplying the propagation velocity of the data through the circuit by multiple time delays to the multiple reflection peaks, for summing the multiple time delays, and for dividing the sum of the time delays by the number of time delays.

Additionally according to this aspect of the invention, the second device comprises a digital root raised cosine filter.

Further according to this aspect of the invention, the second device comprises a digital root raised cosine filter with an excess bandwidth factor of 20%.

BRIEF DESCRIPTIONS OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
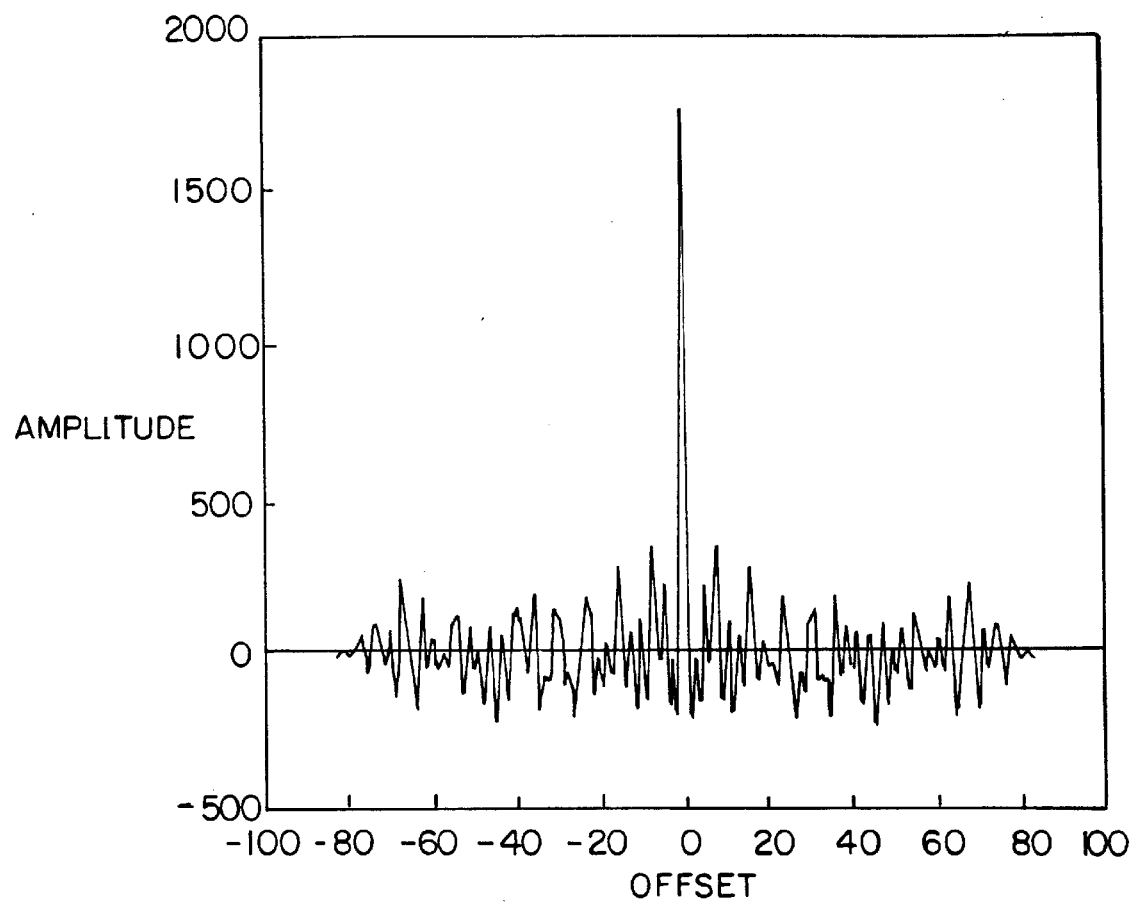
FIG. 1 illustrates the autocorrelation of a quasi-random sequence of data having eight possible values (−7, −5, −3, −1, 1, 3, 5 and 7) useful in understanding the present invention.

As CATV systems evolve to carry digital video data, such as HDTV and digitally compressed standard video signals, a major concern is developing over the quality of current cable plants and subscriber circuits to transmit, receive and process the high speed digital data reliably. One of the major impediments to such transmission, reception and processing is believed to be reflections generated by impedance mismatches throughout the CATV circuit. The CATV industry appears to be moving toward the use of 64 symbol quadrature amplitude modulation (64 QAM), operating at a data rate of 30 megabits per second (30 Mbps), with each symbol requiring six bits, for a symbol rate of 5 megasymbols per second (5 Msps).

It is presently contemplated that receiver implementations of 64 QAM will include adaptive equalization designed to mitigate the effects of reflections, among other imperfections. However, adaptive equalizers have limits on their effectiveness. For example, if reflections are more than a few symbol times away, the equalizer may not be capable of compensating for them. Additionally, even if reflections are within the time range of the equalizer, if the magnitude of a reflection is too large, the equalizer will not converge, that is, it will not adapt in such a way as to mitigate the effects of whatever channel impairment(s) it is attempting to mitigate. Typical values for reflection delay and magnitude equalization limits may be in the range of 5 symbol times and −10 dB, respectively. Assuming that the equalizer is capable of converging, after it has converged, observation of the equalizer tap values can provide insight into the delay and magnitude of the reflections on the line. These defects can then be identified and repaired. However, since there can be situations in which a set top unit equipped with an adaptive equalizer will have difficulty demodulating data due to reflections, a test instrument capable of detecting reflections without the need to demodulate data would be extremely useful.

Equipment has long been in use to measure reflections. Such equipment includes, for example, TDRs, including OTDRs, and frequency sweep systems. Each of these methods of measuring reflections requires the injection of a known signal into the cable system and observation of the cable system for the effects of reflections. This method has the disadvantages that it requires a reference signal generation instrument, and either interfering with whatever signals are already on the system or requiring unused frequency spectrum in the system. The method according to the present invention uses the 64 QAM data carrier itself to detect reflections without the need to converge an adaptive equalizer or demodulate data. The invention makes use of the presence on the 64 QAM data carrier of random or at least quasi-random data. This assumption is not unwarranted since most 64 QAM systems require a data randomizer at the transmitter to assure enough signal transitions to obtain timing and carrier synchronization.

The present invention utilizes the autocorrelation properties of random data. The correlation of two N length sequences x[n] and y[n] of data is defined as $$R_{xy}[m] = \sum_{n=0}^{N-|m|-1} x[n]y[n+m]. \tag{1}$$

Replacing y[n] with x[n], because this is autocorrelation, $$R_x[m] = \sum_{n=0}^{N-|m|-1} x[n]x[n+m]. \tag{2}$$

Correlation is a measure of the similarity of two sequences. Autocorrelation detects periodic similarities in a single sequence. Since random data should have no periodicity, autocorrelation of random or at least quasi-random data should be nearly zero at all offsets of the autocorrelated signal except zero offset. FIG. 1 illustrates the autocorrelation of a quasi-random sequence. Each point in the sequence can assume one of $2^3$, or 8, possible values. Eight possible data values were chosen for this plot because each of the I and Q subchannels of a 64 QAM data stream is made up of symbols with eight possible values. As FIG. 1 illustrates, the autocorrelation exhibits the expected single peak at zero offset and values close to zero everywhere else, indicating that the function is aperiodic. This alone would commend autocorrelation as an effective tool in this application except that, in 64 QAM systems, digital data must also pass through a bandwidth-limiting filter prior to transmission. This process keeps transmitted energy contained in the designated channels of the 64 QAM system. In digital CATV, the channel width is 6 MHZ.

Figure 2:
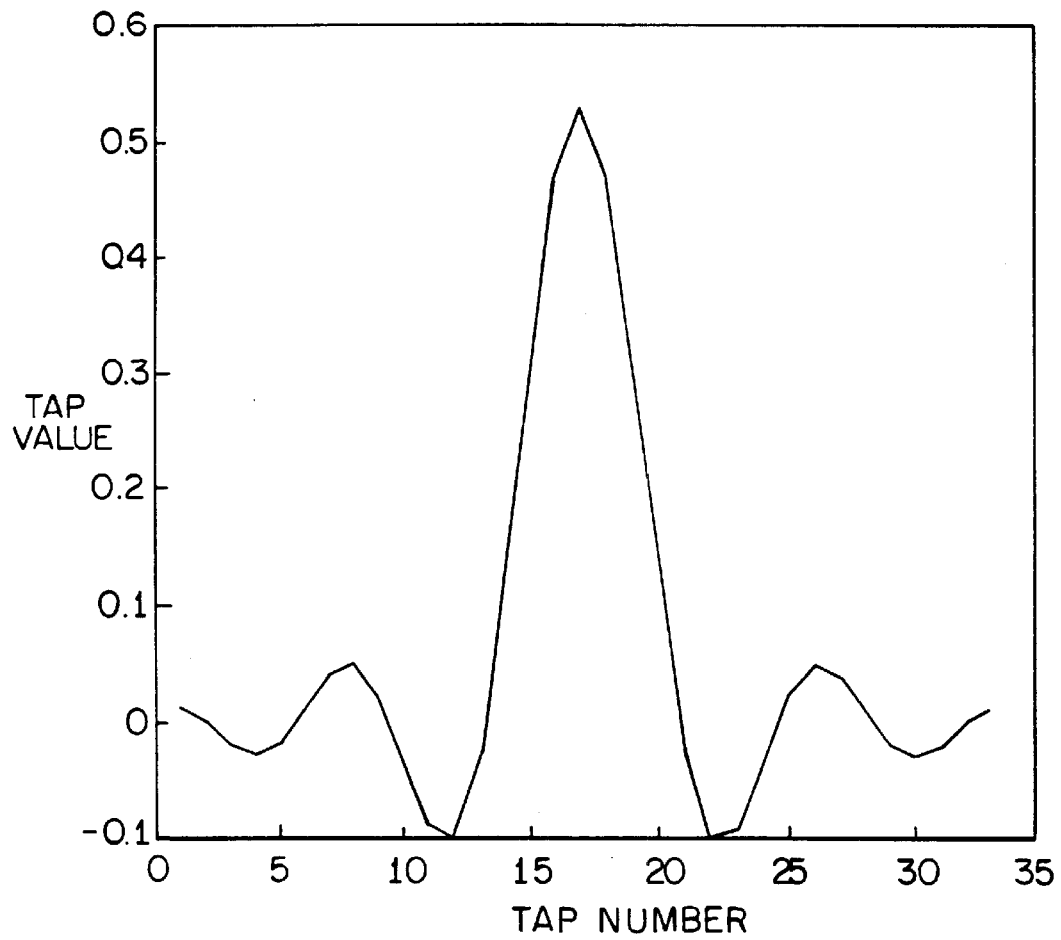
FIG. 2 illustrates a filter characteristic useful in understanding the present invention.
Figure 3:
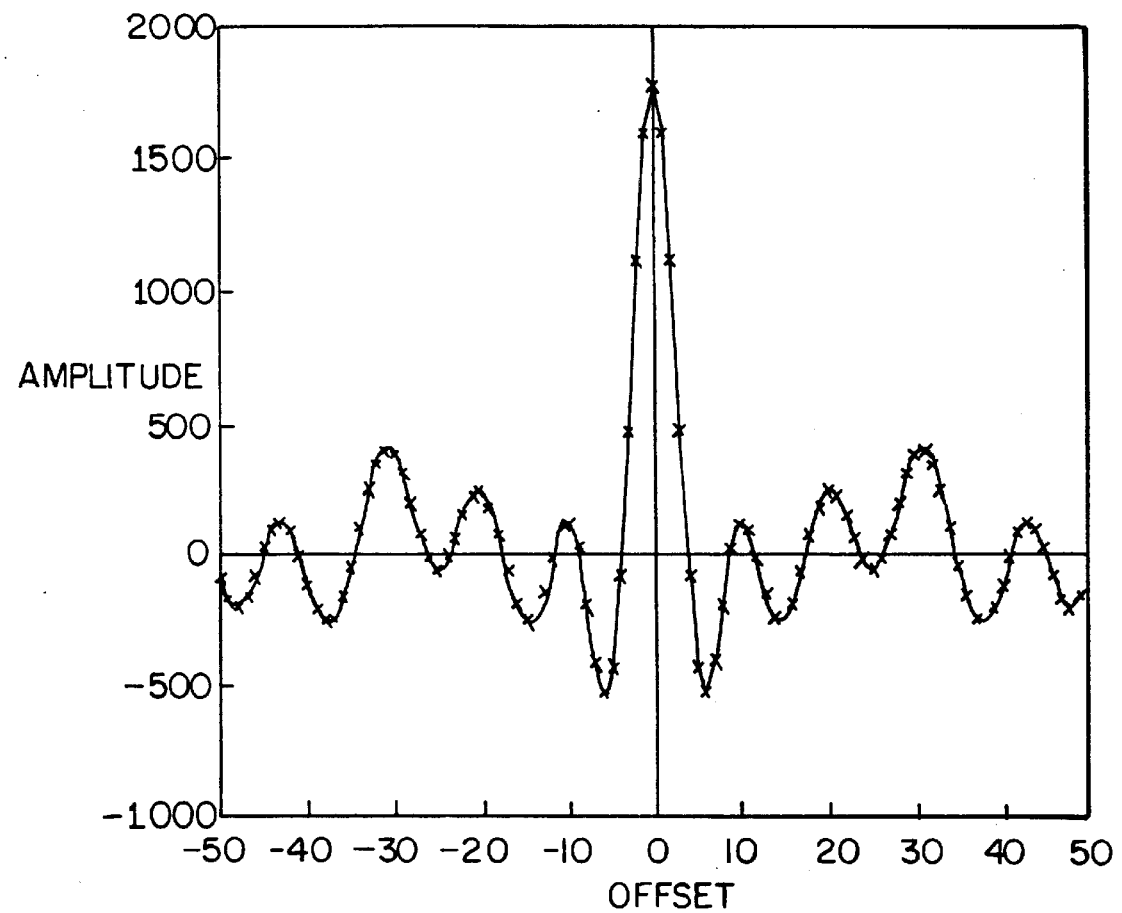
FIG. 3 illustrates the characteristic of the autocorrelation illustrated in FIG. 1 filtered by a filter having the characteristic illustrated in FIG. 2.

A digital root raised cosine filter with an excess bandwidth factor of 20% is emerging as the standard transmit data filter. The characteristic of a digital root raised cosine filter with an excess bandwidth factor of 20% is illustrated in FIG. 2. While such a filter constrains the bandwidth of the transmitted energy to a 6 MHZ channel (which permits multiple channels to be transmitted on a single CATV conductor), it also has the effect of broadening the autocorrelation peak illustrated in FIG. 1. FIG. 3 illustrates an enlarged view of the autocorrelation illustrated in FIG. 1 filtered by the filter whose characteristic is illustrated in FIG. 2. As illustrated in FIG. 3, the main lobe of the autocorrelation of the filtered data occupies approximately four samples on either side of the central peak. This assumes four filtered samples per data symbol, a common assumption in digital communication systems. Since the data symbol rate is 5 Msps, the illustrated sample rate is 20 megasamples per second. Stated another way, the sample period is 50 nanoseconds. Four samples thus occupy 200 nsec. In CATV cable coated with polyethylene (PE), the propagation velocity of an electromagnetic disturbance is $2\times10^8$ meters/sec. Thus, the 200 nsec time occupied by four samples is equivalent to 40 m travel in the PE cable.

Figure 4:
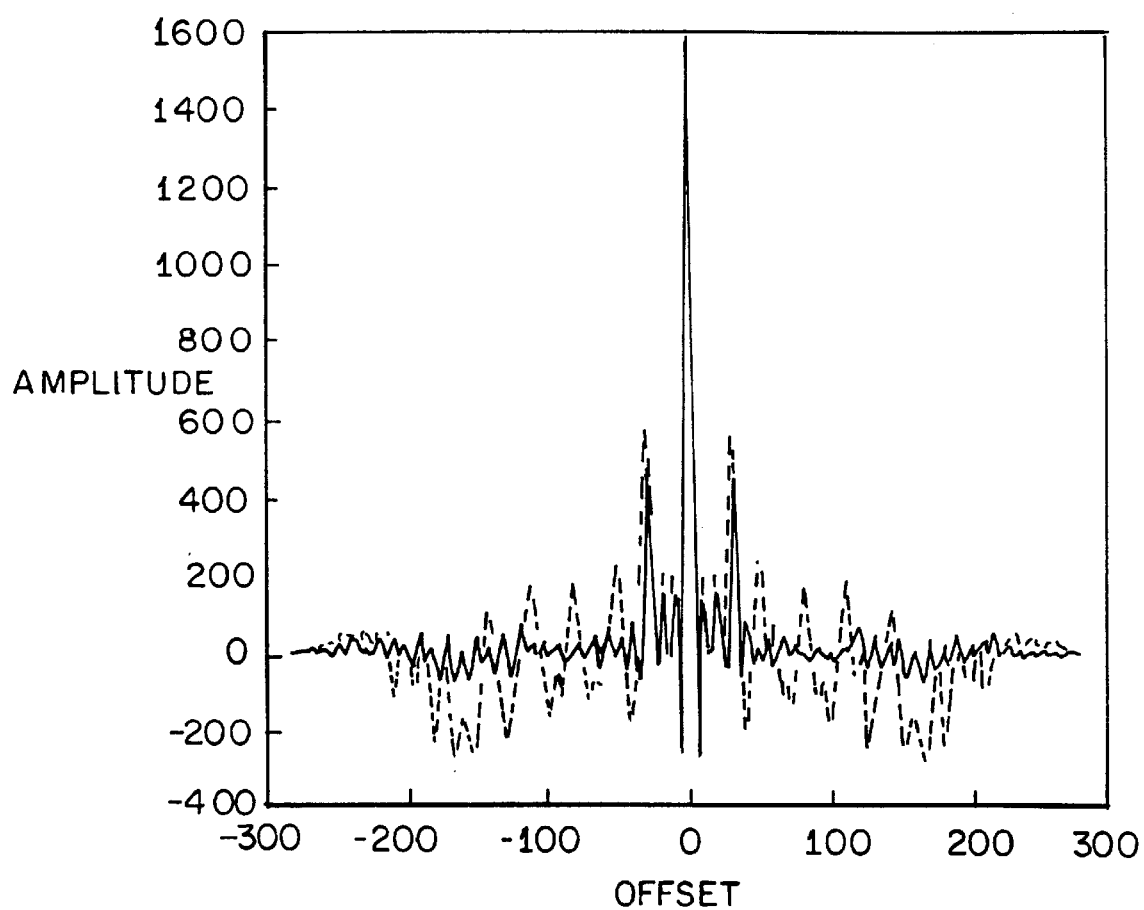
FIG. 4 illustrates plots of the product of a single autocorrelation and the averaging of two autocorrelations on the same graph to illustrate an aspect of the present invention.

These observations provide a method for locating reflection-producing discontinuities in the CATV cable. Since a reflection is, theoretically, a time-delayed version of the transmitted signal, with some amount of attenuation owing to cable loss and the loss resulting from the reflection impedance mismatch, autocorrelation of the transmitted signal with the reflected signal should exhibit peaks not only at zero offset, but also at an offset corresponding to the transmission/reflection transit time. This secondary peak will be a scaled down version of the zero offset lobe, with the scaling factor proportional to the magnitude of the cable and impedance mismatch losses. This scaling is the reason why it is important that the autocorrelation function of the data should be as close as reasonably possible to zero outside the main lobe. Otherwise, the reflection peak in the autocorrelation function resulting from a low order impedance mismatch might be subject to being obscured by the autocorrelation noise. The effects of autocorrelation noise can be reduced further by averaging a number of autocorrelations. FIG. 4 illustrates two plots. Both illustrate autocorrelation of a signal with a −10 dB reflection 150 m away (300 m round trip). The broken line plot illustrates the results of a single autocorrelation. The solid line plot illustrates the average of ten autocorrelations. As will be appreciated, the effects of autocorrelation noise are significantly reduced, and the reflection peak in the autocorrelation function enhanced, by averaging.

Were it not for the effects of modulation of the random data onto the quadrature (I and Q) RF carrier, this analysis would be complete, having demonstrated the benefit of using autocorrelation to ascertain impedance mismatch reflections and the like in CATV systems. However, with an RF carrier, the reflection is not only a time-delayed and attenuated copy of the transmitted signal, but is also phase rotated an amount determined by the number of wavelengths modulo 360° of the reflection. The phase rotation causes the reflected signal's I and Q components to be misaligned with the I and Q components of the transmitted signal. Reference is here made to the definition of the autocorrelation of a complex signal:

$$R_x[m] = \sum_{n=0}^{N-|m|-1} x[n]x*[n+m] \quad (3)$$

where x*[n] denotes the complex conjugate of x[n]. Hence, since QAM transmits independent data streams in the I and Q subchannels, autocorrelation of baseband QAM results in a sequence whose real-valued part has a peak at zero offset twice the height of the peak in the autocorrelation of either the I or Q subchannel alone. The imaginary-valued part of the autocorrelation results from the cross-correlation of the I data and the Q data. Since these data sequences are independent and have zero means, their cross-correlation has approximately zero value everywhere. When this baseband I and Q subchannel information is modulated onto an RF carrier, and assuming an arbitrary phase rotation $\phi$ of the reflection, $$R_x[m] = \sum_{n=0}^{N-|m|-1} x[n]x^*[n+m], \text{ where } x[n] = I[n] + jQ[n] \quad (4)$$

$$= \sum_{n=0}^{N-|m|-1} (I[n] + jQ[n])(I[n+m] - jQ[n+m])e^{j\phi} \quad (5)$$

$$= \sum_{n=0}^{N-|m|-1} (I[n] + jQ[n])(I[n+m] - jQ[m+m])(\cos\phi + j\sin\phi) \quad (6)$$

$$= \sum_{n=0}^{N-|m|-1} (I[n]I[n+m] - jI[n]Q[n+m] + \quad (7)$$
$$jI[n+m]Q[n] + Q[n]Q[n+m])(\cos\phi + j\sin\phi)$$

This simplifies to $$R_x[m] = (R_I[m] + R_Q[m])(\cos\phi + j\sin\phi). \quad (8)$$

To determine the magnitude of this function, it can be multiplied by its complex conjugate, $(R_I[m]+R_Q[m])$ (cos $\phi$−jsin $\phi$). Doing so yields $$|R_x[m]| = R_I[m] + R_Q[m]. \quad (9)$$

Since the autocorrelation of each of the separate data streams will have the requisite narrow main lobe and low sideband noise, as previously demonstrated, their sum will also. Therefore, the autocorrelation of the transmitted 64 QAM data stream with its reflection from impedance mismatches in the CATV circuit can reliably by used to determine the distances to these impedance mismatches. The following experiments were conducted to demonstrate the reliability of this technique.

Figure 5:
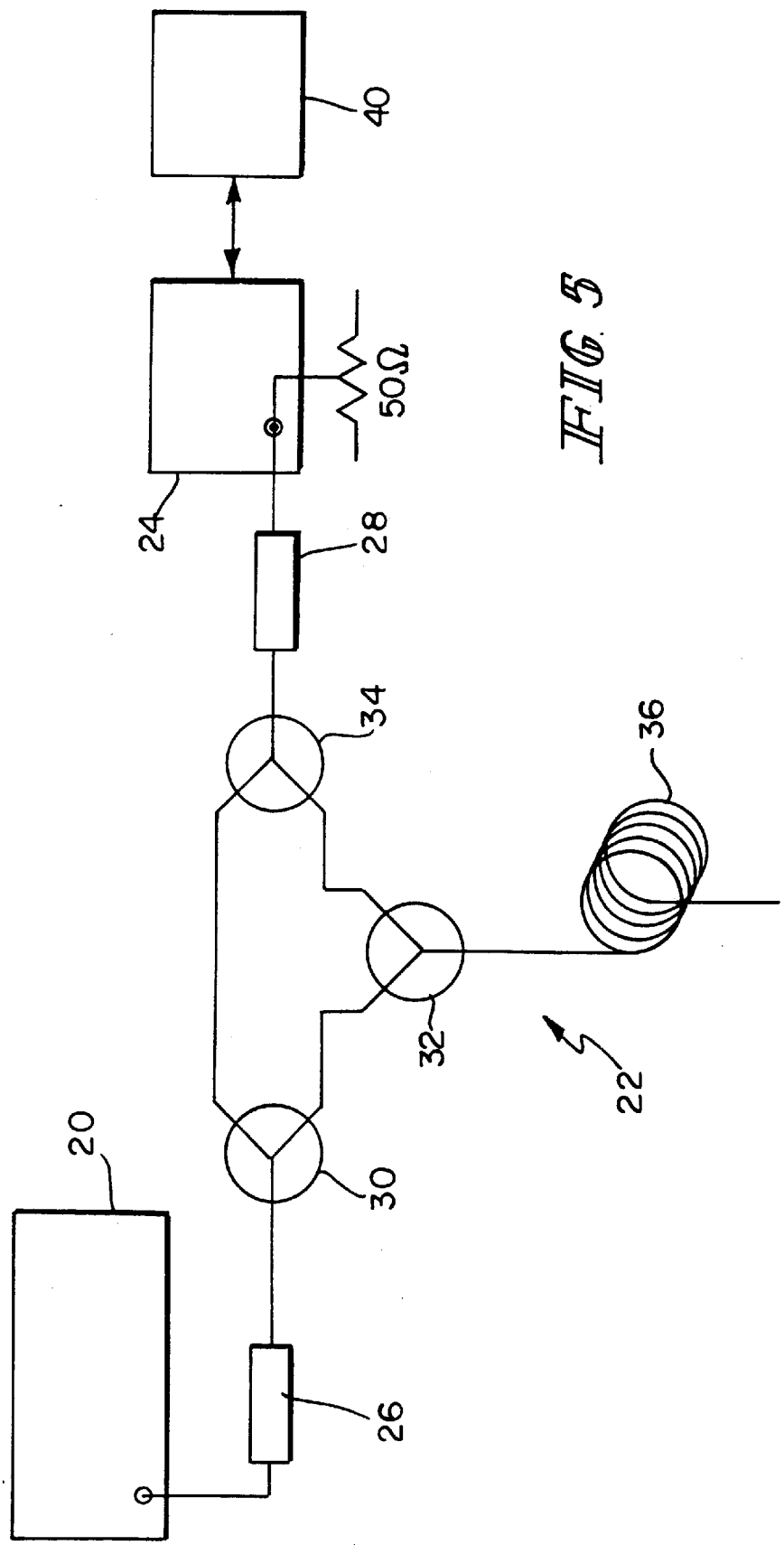
FIG. 5 illustrates a partly block and partly schematic diagram of a circuit for testing the present invention.

With reference to FIG. 5, an arbitrary waveform generator 20 such as, for example, a Stanford Research Systems model DS345 AWG, having an output sample rate of 40 MHZ was programmed to output 16,100 samples of 64 QAM data repeatedly. This corresponds to about 2000 symbols of 64 QAM data at 30 Mbps. The data was modulated on a 4 MHZ carrier. This signal was then placed on a reflection-generating cable system 22, and a digital oscilloscope 24 such as, for example, a Gage model CS1012 oscilloscope sampling at 20 Msamples/sec., was used to monitor the reflections. The test circuit included 50 Ω−75 • impedance matching transformers 26, 28, two-way 75 Ω splitters 30, 32, 34, and a length 36, for example, 150.1 m, of test cable, such as, for example, Belden 9231 or 9266 video cable, a terminal length of, for example, 6.9 m of Channel Master RG-59 video cable terminated by a 2 dB pad. The data recovered by the digital oscilloscope 24 was then transferred to the Matlab program running on a PC 40 for analysis according to the present invention.

Figure 6:
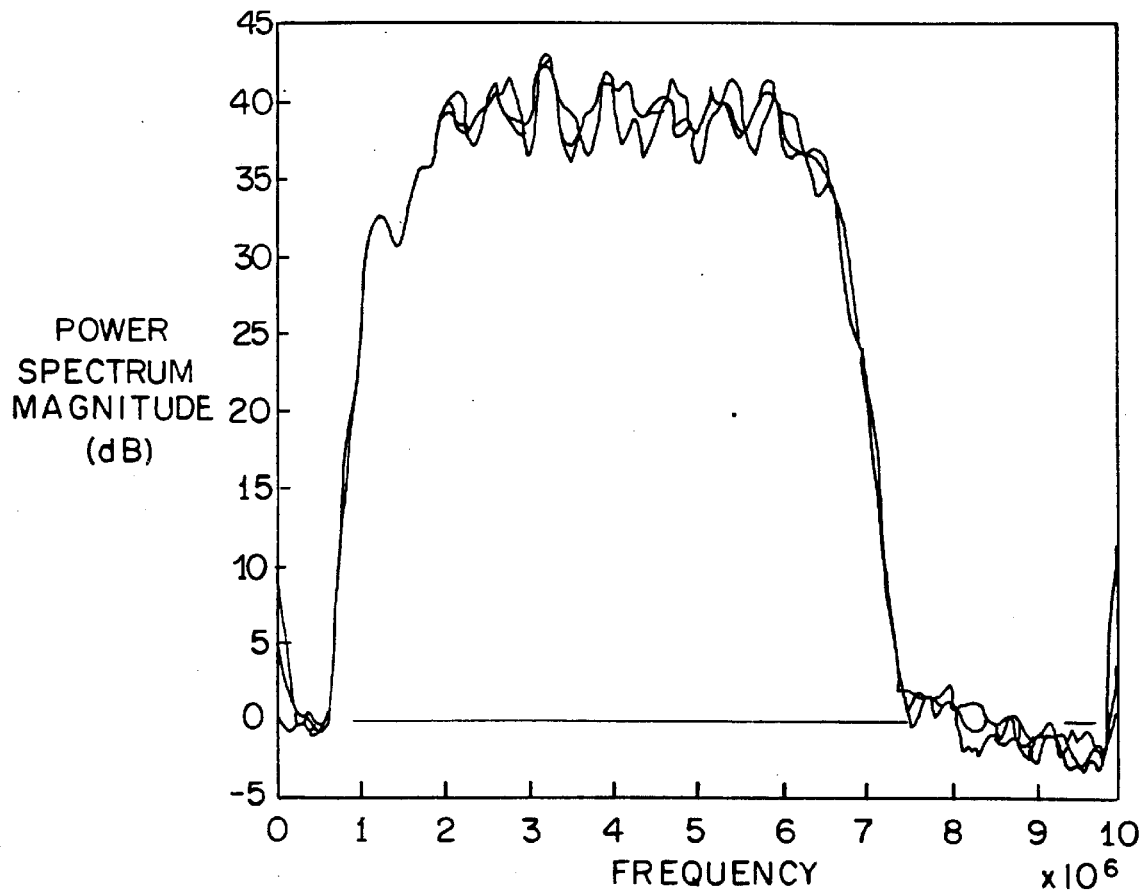
FIG. 6 illustrates a plot of power spectral density versus frequency of a test signal according to the present invention.
Figure 7:
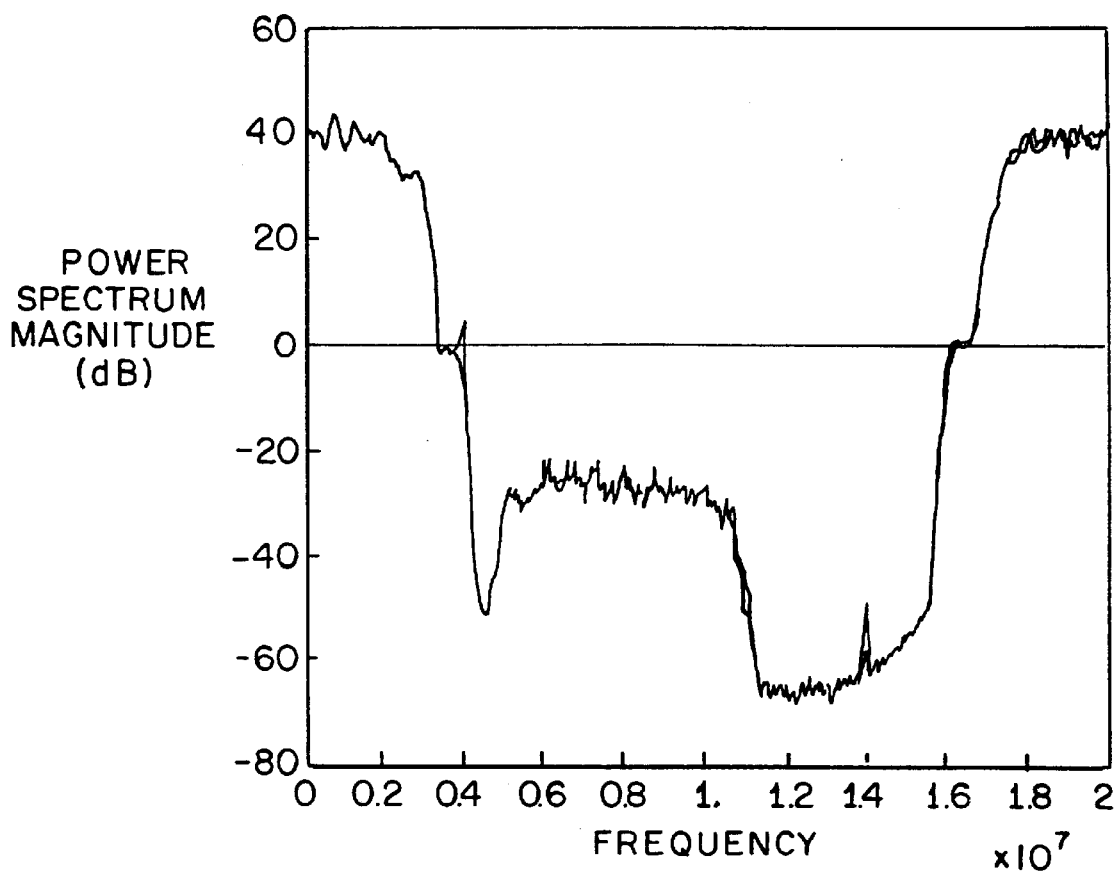
FIG. 7 illustrates a plot of power spectral density versus frequency of a processed test signal according to the present invention.

Several experiments using different lengths 36 of test cable and terminations were run to determine the accuracy and resolution of the reflection delay and amplitude measurement. FIG. 6 illustrates a typical power spectrum of collected test data, including the transmitted signal and the reflection. As illustrated in FIG. 6, the signal width is less than 6 MHZ and is centered at 4 MHZ. The power spectrum extends from DC to the 10 MHZ Nyquist limit. The first step is to recover the I and Q data. This is accomplished by complex downconversion to a center frequency, ideally 0 Hz, but in any event much less than the symbol rate. Frequencies in the range of 50 KHz are acceptable. As previously demonstrated, phase offset does not adversely affect the measurement either. After complex downconversion, the resulting signal is low pass filtered to remove the component at twice the original carrier frequency. The result of this filtering is illustrated in FIG. 7. Since the signal is now complex valued, all frequencies from DC to the sampling frequency must be illustrated to illustrate the signal's spectral density. Once the near-baseband I and Q signals have been recovered, a complex autocorrelation, as described above, can be performed.

Figure 8:
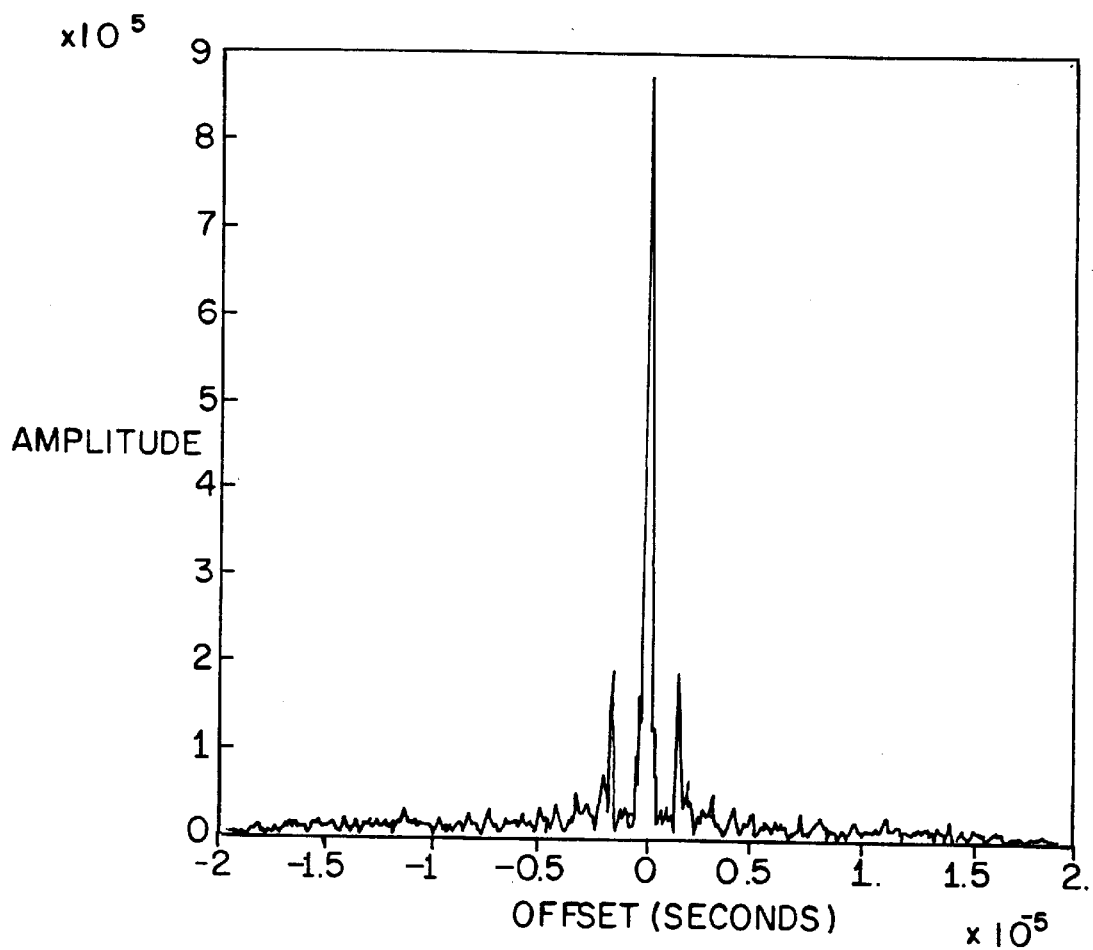
FIG. 8 illustrates a plot of amplitude versus time offset of averaged correlations of a processed test signal according to the present invention.

It should be remembered that the AWG 20 output was a continuous repetition of 16,100 samples at 40 MHZ which represented about 2000 64 QAM symbols. Since the digital oscilloscope 24 samples at 20 MHZ, it will recover 16,100/2, or 8050, unique samples before the stream repeats. By identifying the transmit finite impulse response filter startup and ending transients in the recovered data, an 8050 point unique received data sequence of 2000 symbols is used. 2000/K complex autocorrelations are then performed on blocks of K symbols out of the 2000 total symbols received. The results from these autocorrelations are then averaged and the magnitude of the average of the complex autocorrelations is computed as described in equation 9. The result of this autocorrelation is illustrated in FIG. 8. From FIG. 8, one significant reflection at approximately 1.5 $\mu$sec. is immediately recognizable. To identify others, the scale of FIG. 8 is expanded in FIG. 9.

Figure 9:
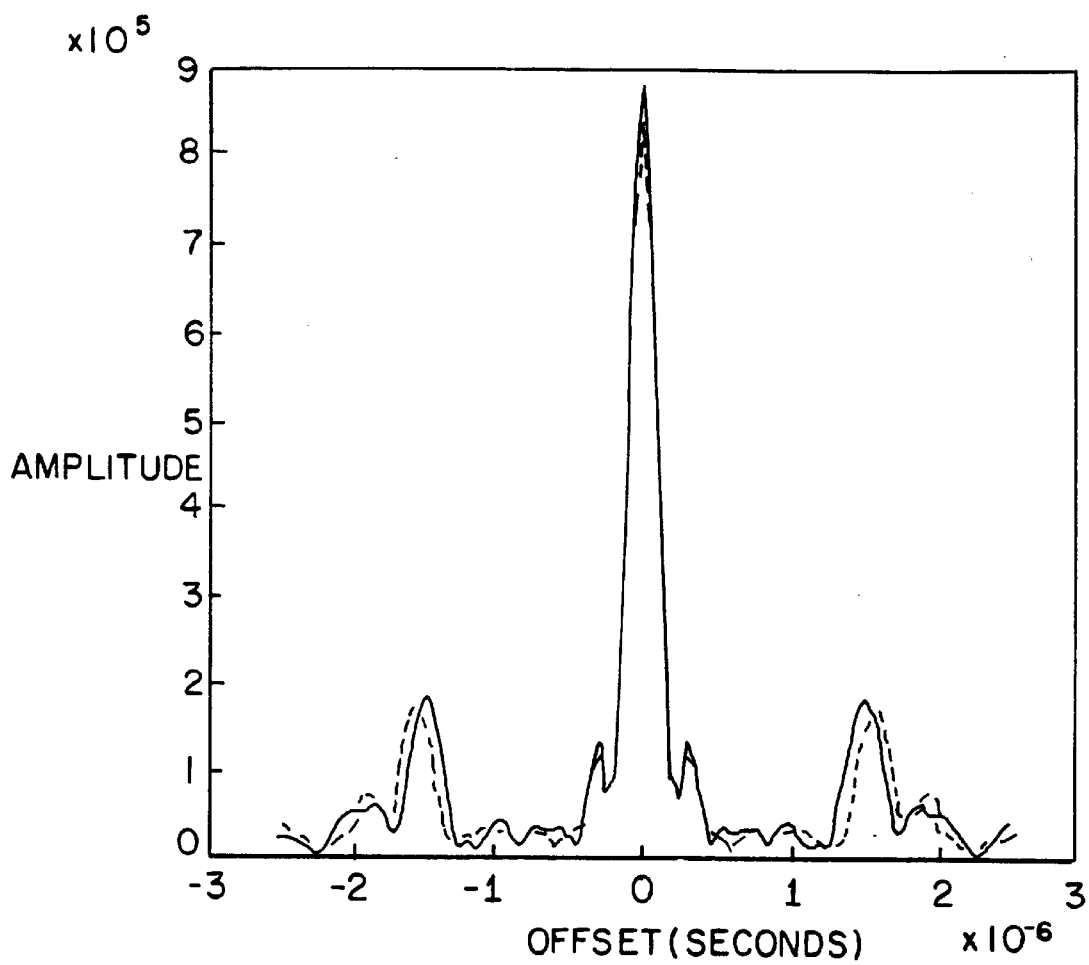
FIG. 9 illustrates a plot of amplitude versus time offset of averaged correlations of a processed test signal according to the present invention; and, FIG. 10 illustrates plots of amplitude versus time offset of the imaginary parts of the autocorrelations of two test signals according to the present invention as well as the average of these two plots.

FIG. 9 illustrates three plots, two in broken lines and one in solid lines. The broken line plot with the lowest amplitude sidelobes was generated using the test apparatus illustrated in FIG. 5 in which the length of test cable included 150.1 m of Belden 9231 video cable, 6.9 m of Channel Master RG-59 video cable and a 2 dB pad terminating the RG-59 cable. This plot illustrates a fairly well-defined reflection at 1.566 $\mu$sec., corresponding to termination of the Channel Master RG-59 cable, and an amplitude about 3.6 dB lower than the other broken line plot, the plot generated from the same lengths of cable with the 2 dB terminal pad removed. The solid line plot was generated using the test apparatus illustrated in FIG. 5 with the 150.1 m length of 9231 cable only. The data illustrated in FIG. 9 agree remarkably well with the physical test setup. The propagation velocity in the 9231 cable is $2 \times 10^8$ m/sec. The 1.566 $\mu$sec. offset thus corresponds to a round trip distance of 313.2 m compared with the 314 m (150.1 m +6.9 m) actual distance. The 9231 cable itself generated a reflection sidelobe peak at 1.497 $\mu$sec., corresponding to a distance of 299.4 m versus an actual round trip distance of 300.2 m. The presence of the 2 dB pad termination is also evident in the difference in the amplitudes of the sidelobes of the two broken line plots.

Figure 10:
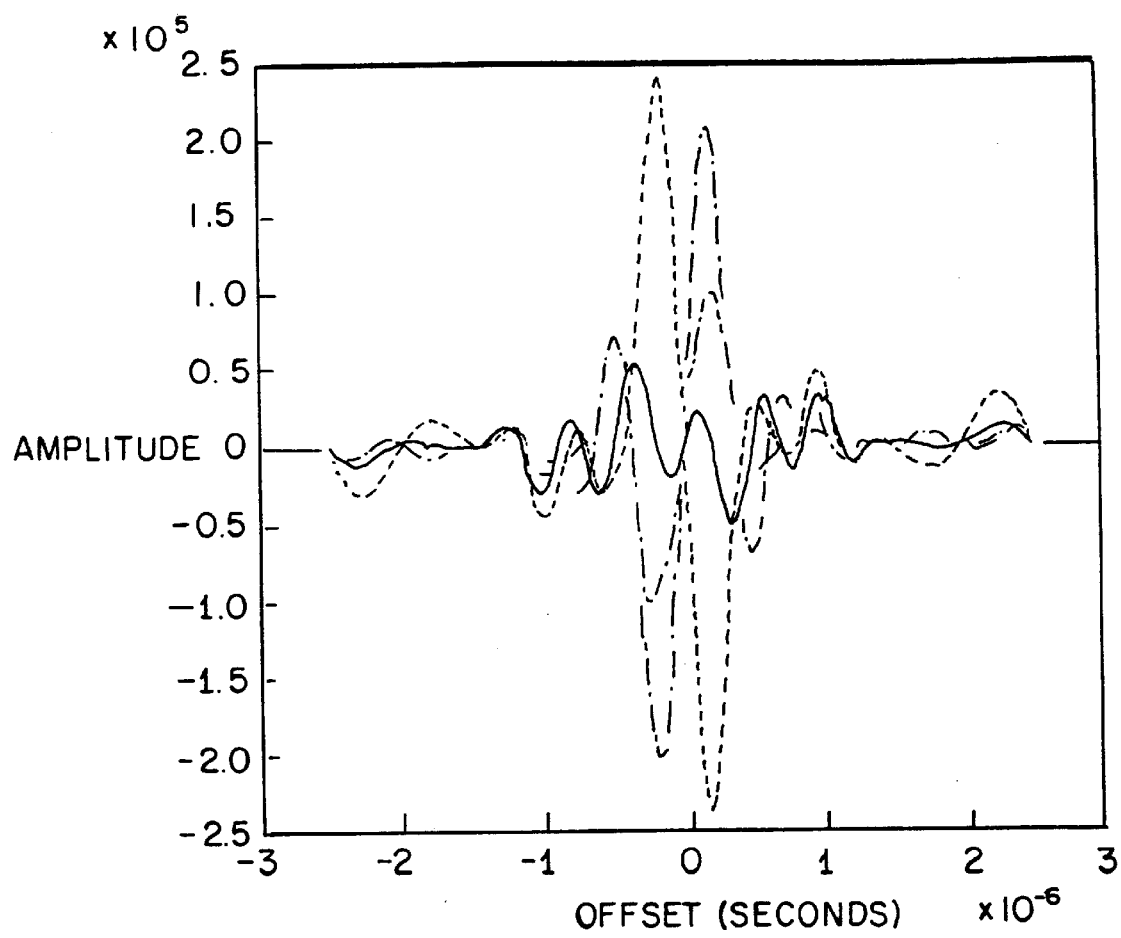

It should be noted that the width of the main lobe in the illustrated embodiment will obscure any reflections within a couple of hundred nsec., corresponding to a distance of about 30 m or so. However, the main lobe component is entirely in the real component of the autocorrelation response. The imaginary component is simply $2R_{IQ}[m]$, which is zero when there is no reflection. When there is a reflection, there will be a phase angle dependent response in the imaginary part of the autocorrelation. FIG. 10 illustrates this effect. As illustrated there, a significant response can be seen quite close to zero offset in the imaginary component. However, the absolute magnitude of the response is dependent upon the phase angle of the carrier to the reflection. It is likely that a scheme repeating this test at multiple carrier frequencies could extrapolate an absolute amplitude, since changing the carrier frequency will also change the phase angle to the reflection.

It should further be noted that, although the illustrative embodiment was disclosed generally in the context of testing of the forward path from the CATV plant toward the subscriber apparatus, the same principles can be applied directly to testing of the return path from the subscriber apparatus toward the CATV plant in two-way systems. In the return path, modulation is typically quadrature phase shift keying or 16 QAM. The delay resolution of the measurement will not be sensitive to the modulation format. It is, however, proportional to the modulation bandwidth. The wider the bandwidth, the finer the resolution and the closer to the source reflections can be detected. As with 64 QAM measurements, the data must still be randomized or at least quasi-randomized. Again, however, this is generally a standard feature of digital communications systems.

What is claimed is:

1. A method for determining a transit time to a feature in a digital communication circuit comprising (a) generating data that is at least quasi-random, (b) transmitting the at least quasi-random data along the digital communication circuit from a transmitting end of the digital communication circuit, (c) recovering reflections from the digital communication circuit adjacent the transmitting end of the digital communication circuit, (d) correlating the reflections with the data to generate a correlation result, (e) identifying a reflection peak in the correlation result, and (f) determining a time delay to the reflection peak.

2. The method of claim 1 further comprising (g) repeating steps (a)–(f), and (h) developing average time delays over a number of repetitions.

3. The method of claim 1 for determining a location of an impedance mismatch in the digital communication circuit, recovering reflections from the digital communication circuit comprising recovering a reflection from an impedance mismatch in the digital communication circuit, the method further comprising multiplying a propagation velocity of the at least quasi-random data through the digital communication circuit by the time delay to determine a round trip distance to the impedance mismatch.

4. The method of claim 3 further comprising (g) conducting steps (a)–(f) a number of times, and (h) developing average time delays over the number of times steps (a)–(t) have been conducted.

5. The method of claim 4 wherein developing average time delays over the number of times steps (a)–(f) have been conducted comprises summing the time delays determined from conducting steps (a)–(f) to develop a sum of the time delays, and dividing the sum of the time delays by the number of times steps (a)–(f) have been conducted.

6. The method of claim 1 further comprising passing the data through a digital root raised cosine filter.

7. The method of claim 6 wherein passing the data through a digital root raised cosine filter comprises passing the data through a digital root raised cosine filter with an excess bandwidth factor of 20%.

8. The method of claim 2 further comprising passing the data through a digital root raised cosine filter.

9. The method of claim 8 wherein passing the data through a digital root raised cosine filter comprises passing the data through a digital root raised cosine filter with an excess bandwidth factor of 20%.

10. The method of claim 3 further comprising passing the data through a digital root raised cosine filter.

11. The method of claim 10 wherein passing the data through a digital root raised cosine filter comprises passing the data through a digital root raised cosine filter with an excess bandwidth factor of 20%.

12. Apparatus for determining a transit time to a feature in a digital communication circuit comprising a first device for generating data that is at least quasi-random, a second device for coupling the first device to the digital communication circuit to transmit the at least quasi-random data along the digital communication circuit from a transmitting end of the digital communication circuit, a third device for recovering reflections from the digital communication circuit, the third device coupled to the digital communication circuit adjacent the transmitting end of the digital communication circuit, and a fourth device for correlating the reflections with the data to generate a correlation result, for identifying a reflection peak in the correlation result, and for determining a time delay to the reflection peak.

13. The apparatus of claim 12 wherein the fourth device comprises a fourth device for correlating multiple reflections with multiple strings of data to generate multiple correlation results, and for developing average time delays over the multiple correlation results.

14. The apparatus of claim 12 for determining a location of an impedance mismatch in the digital communication circuit, the third device recovering reflections from the impedance mismatch in the circuit, and the fourth device comprising a fourth device for multiplying e a propagation velocity of the data through the digital communication circuit by the time delay to determine a round trip distance to the impedance mismatch.

15. The apparatus of claim 14 wherein the fourth device comprises a fourth device for correlating multiple reflections with multiple strings of data to generate multiple correlation results, and for developing average time delays over multiple correlation results.

16. The apparatus of claim 15 wherein the fourth device comprises a fourth device for correlating multiple reflections with multiple strings of data to generate multiple correlation results, for identifying multiple reflection peaks in the multiple correlation results, for multiplying a propagation velocity of the data through the digital communication circuit by multiple time delays to the multiple reflection peaks, for summing the multiple time delays, and for dividing the sum of the multiple time delays by the number of the multiple time delays.

17. The apparatus of claim 12 wherein the second device comprises a digital root raised cosine filter.

18. The apparatus of claim 17 wherein the second device comprises a digital root raised cosine filter with an excess bandwidth factor of 20%.

19. The apparatus of claim 13 wherein the second device comprises a digital root raised cosine filter.

20. The apparatus of claim 19 wherein the second device comprises a digital root raised cosine filter with an excess bandwidth factor of 20%.

21. The apparatus of claim 14 wherein the second device comprises a digital root raised cosine filter.

22. The apparatus of claim 21 wherein the second device comprises a digital root raised cosine filter with an excess bandwidth factor of 20%.

* * * * *